United States Patent
Hunsaker et al.

(10) Patent No.: US 9,185,661 B2
(45) Date of Patent: Nov. 10, 2015

(54) PERFORMING POWER CONTROL BASED ON NOMINAL PACKET SIZE

(71) Applicant: Nokia Siemens Networks Oy, Espoo (FI)

(72) Inventors: Matthew Hunsaker, Chandler, AZ (US); Daniel Tayloe, Phoenix, AZ (US)

(73) Assignee: Nokia Solutions and Networks Oy, Espoo (FI)

( * ) Notice: Subject to any disclaimer, the term of this patent is extended or adjusted under 35 U.S.C. 154(b) by 157 days.

(21) Appl. No.: 13/872,288

(22) Filed: Apr. 29, 2013

(65) Prior Publication Data

US 2013/0322359 A1 Dec. 5, 2013

Related U.S. Application Data

(60) Provisional application No. 61/655,037, filed on Jun. 4, 2012.

(51) Int. Cl.
*H04W 52/24* (2009.01)
*H04W 52/26* (2009.01)
*H04W 52/14* (2009.01)
*H04W 52/36* (2009.01)

(52) U.S. Cl.
CPC .......... *H04W 52/241* (2013.01); *H04W 52/262* (2013.01); *H04W 52/143* (2013.01); *H04W 52/146* (2013.01); *H04W 52/365* (2013.01)

(58) Field of Classification Search
USPC ....................................................... 370/318
See application file for complete search history.

(56) References Cited

U.S. PATENT DOCUMENTS

| | | | |
|---|---|---|---|
| 2005/0105589 A1* | 5/2005 | Sung et al. | 375/130 |
| 2007/0197251 A1 | 8/2007 | Das et al. | 455/522 |
| 2008/0049698 A1 | 2/2008 | Kim | 370/342 |
| 2010/0035645 A1* | 2/2010 | Chang et al. | 455/522 |
| 2010/0216405 A1* | 8/2010 | Bhadra et al. | 455/63.1 |

FOREIGN PATENT DOCUMENTS

WO  WO-2011/159123 A2  12/2011

OTHER PUBLICATIONS

3GPP, 3GPP TS 36.213 v10.5.0 (Mar. 2012), Mar. 2014, 125 pages.*
3GPP TS 36.213 v8.4.0 (Sep. 2008); 3rd Generation Partnership Project; Technical Specification Group Radio Access Network; Evolved Universal Terrestrial Radio Access (E-UTRA); Physical layer procedures, (Release 8) (60 pages).

(Continued)

*Primary Examiner* — Hoon J Chung
(74) *Attorney, Agent, or Firm* — Harrington & Smith

(57) ABSTRACT

Performing power control by determining a maximum required signal-to-interference plus noise ratio for a nominal packet size of a received data signal, wherein the maximum required signal-to-interference plus noise ratio corresponds to a quantity of physical resource blocks used for the nominal packet size of the data signal. A received signal-to-interference plus noise ratio of the received data signal is compared with the maximum required signal-to-interference plus noise ratio. In response to the received signal-to-interference plus noise ratio exceeding the maximum required signal-to-interference plus noise ratio, power control is performed for the data signal to reduce the received signal-to-interference plus noise ratio.

21 Claims, 2 Drawing Sheets

(56) References Cited

OTHER PUBLICATIONS

3GPP TSG RAN WG1 Meeting #62; R1-104586; Samsung; "UL SU-MIMO power control"; Madrid, Spain, Aug. 23-27, 2010 (5 pages).

"3$^{rd}$ Generation Partnership Project; Technical Specification Group Radio Access Network; Evolved Universal Terrestrial Radio Access (E-UTRA); Physical layer procedures (Release 10)", 3GPP TS 36.213 V10.3.0, Section 5.1.1.1, Sep. 2011.

* cited by examiner

PERFORMING POWER CONTROL BASED ON NOMINAL PACKET SIZE

CROSS-REFERENCE TO RELATED APPLICATIONS

The present application claims the benefit under 35 U.S.C. §119(e) of U.S. Provisional Patent Application No. 61/655,037, filed on Jun. 4, 2012, the disclosure of which is hereby incorporated by reference in its entirety.

TECHNICAL FIELD

The exemplary and non-limiting embodiments of this invention relate generally to wireless communications and, more specifically, to controlling power and a number of physical resource blocks per nominal packet size for data transmission.

BACKGROUND ART

The following abbreviations that may be found in the specification and/or the drawing figures are defined as follows:
3GPP third generation partnership project
AWGN additive white Gaussian noise
BLER block error rate
C/I carrier-to-interference ratio
DL downlink
ECP extended cyclic prefix
E-UTRA evolved universal terrestrial radio access
eNB or eNodeB evolved node B/base station in an E-UTRAN system
E-UTRAN evolved UTRAN (LTE)
GBR guaranteed bit-rate
ID identification, identifier
IP internet protocol
LTE long term evolution
LTE-A long term evolution advanced
MCS modulation and coding scheme
PC power control
PHR power headroom report
PRB physical resource block
PUSCH Physical Uplink Shared Channel
QAM quadrature amplitude modulation
RF radio frequency
RSSI received signal strength indicator
SINR signal-to-interference plus noise ratio
TPC transmitter power control
TBS transport block size
UE user equipment (e.g. mobile terminal)
UL uplink
UMTS universal mobile telecommunications system
UTRAN universal terrestrial radio access network
VoIP voice over IP In Release 10 of the Third Generation Partnership Project (3GPP), physical uplink shared channel (PUSCH) transmit power for a user equipment (UE) in a subframe i for a serving cell c is defined by the following formula (see 3GPP TS 36.213 V10.3.0 (2011-09), Section 5.1.1.1):

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$ (1)

where $P_{CMAX,c}(i)$ denotes a maximum transmission power according to a UE power class in subframe i, and $M_{PUSCH,c}(i)$ is the bandwidth of the PUSCH resource assignment expressed as a number of resource blocks valid for subframe i and serving cell c. The transmission power of the UE increases in proportion to $M_{PUSCH,c}(i)$. $PL_c$ is the downlink path loss estimate calculated in the UE for serving cell c in dB and $\alpha(j)$ denotes a scaling factor, which is determined at higher layers in consideration of a difference between uplink and downlink channels established by a cell formation.

$P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. A Modulation and Coding Scheme (MCS) or Transport Format (TF) compensation parameter $\Delta_{TF,c}(i)$ can be defined as follows:

$$\Delta_{TF,c}(i) = 10 \log_{10}((2^{BPRE \cdot K_s} - 1) \cdot \beta_{offset}^{PUSCH})$$ (2), where $K_S$ is a cell-specific parameter.

Power control based on Ks=1.25 attempts to limit the received carrier-to-interference (C/I) ratio in such a way that the C/I received at the eNB is specific to the particular MCS in use. However, power control based on Ks=1.25 has not proved to be very popular and is not even supported by all UEs. Thus it is not a complete commercial solution to the problem of limiting the interference in the system for small packet users (such as VoIP users) or other users with known packet sizes.

SUMMARY

According to a first set of exemplary embodiments of the invention, a method comprises determining a maximum required signal-to-interference plus noise ratio for a nominal packet size of a received data signal, wherein the maximum required signal-to-interference plus noise ratio corresponds to a quantity of physical resource blocks used for the nominal packet size of the data signal; comparing a received signal-to-interference plus noise ratio of the received data signal with the maximum required signal-to-interference plus noise ratio, and in response to the received signal-to-interference plus noise ratio exceeding the maximum required signal-to-interference plus noise ratio, performing power control for the data signal to reduce the received signal-to-interference plus noise ratio.

According to a further set of exemplary embodiments of the invention, a plurality of respective maximum required signal-to-interference plus noise ratios are determined for each of a plurality of corresponding nominal packet sizes of a data signal, wherein each of the plurality of maximum signal-to-interference plus noise ratios corresponds to a quantity of physical resource blocks used for the corresponding nominal packet size of the data signal.

According to a further set of exemplary embodiments of the invention, performing power control may comprise one or more of: adjusting a power of the data signal and adjusting a number of physical resource blocks per the nominal packet size of the data signal. Further, the number of physical resource blocks for the nominal packet size may be decreased when the signal-to-interference plus noise ratio of the received data signal is larger than a predetermined threshold. Still further, the number of physical resource blocks used in the nominal packet size may be increased when the signal-to-interference plus noise ratio of the received data signal is smaller than a predetermined threshold.

According to a further set of exemplary embodiments of the invention, the data signal may be a parameter Ks=0 and the data signal is received from a user equipment. Further, the number of the one or more maximum required signal-to-interference plus noise ratios may be selected by the network element based on radio frequency conditions of the user equipment sending the data. Still further the managing may comprise of measuring the signal-to-interference plus noise ratio of the received data signal; and providing by the network element to the user equipment instructions for the power control of the data signal based on comparing the measured signal-to-interference plus noise ratio of the received data signal with at least one of the one or more maximum required signal-to-interference plus noise ratios.

According to a still further set of exemplary embodiments of the invention, the one or more maximum required signal-to-interference plus noise ratios may correspond to 1, 2, ..., N physical resource blocks respectively, where N is a finite integer of one or more.

According to a still further set of exemplary embodiments of the invention, each of the quantity of physical resource blocks may have a corresponding TBS index which is lower than a maximum transport block size index for the received data. The quantity may, but need not, be a unique number.

According to a further set of exemplary embodiments of the invention, each of the one or more maximum required signal-to-interference plus noise ratios may be calculated as a sum of an average signal-to-interference plus noise ratio for a corresponding transport block size index, plus a signal-to-noise ratios error and plus a margin According to a further set of exemplary embodiments of the invention, the data may be a voice over internet protocol data with a nominal packet size of 328 bits.

According to a further set of exemplary embodiments of the invention, the nominal packet size may be repetitive.

According to a further set of exemplary embodiments of the invention, each of the one or more maximum required signal-to-interference plus noise ratio may be smaller than a maximum allowable signal-to-interference plus noise ratio.

According to a further set of exemplary embodiments of the invention, the power control may be performed by a network element. According to a still further set of exemplary embodiments of the invention, the network element may be an eNB.

According to another set of exemplary embodiments of the invention, an apparatus comprises at least one processor and a memory storing a set of computer instructions, in which the processor and the memory storing the computer instructions are configured to cause the apparatus to determine a maximum required signal-to-interference plus noise ratio for a nominal packet size of a received data signal, wherein the maximum required signal-to-interference plus noise ratio corresponds to a quantity of physical resource blocks used for the nominal packet size of the data signal; compare a received signal-to-interference plus noise ratio of the received data signal with the maximum required signal-to-interference plus noise ratio, and in response to the received signal-to-interference plus noise ratio exceeding the maximum required signal-to-interference plus noise ratio, perform power control for the data signal to reduce the received signal-to-interference plus noise ratio.

According to a further set of exemplary embodiments of the invention, a plurality of respective maximum required signal-to-interference plus noise ratios are determined for each of a plurality of corresponding nominal packet sizes of a data signal, wherein each of the plurality of maximum signal-to-interference plus noise ratios corresponds to a quantity of physical resource blocks used for the corresponding nominal packet size of the data signal.

According to a further set of exemplary embodiments of the invention, performing power control comprises one or more of: adjusting a power of the data signal and adjusting a number of physical resource blocks per the nominal packet size of the data signal.

According to a further set of exemplary embodiments of the invention, the data signal may have a parameter Ks=0 and the data signal is received from a user equipment.

According to a still further set of exemplary embodiments of the invention, the one or more maximum required signal-to-interference plus noise ratios may correspond to 1, 2, ..., N physical resource blocks respectively, where N is a finite integer of one or more.

According to a further set of exemplary embodiments of the invention, each of the quantity of physical resource blocks may have a corresponding TBS index which is lower than a maximum transport block size index for the received data. The quantity may, but need not, be a unique number.

According to a further set of exemplary embodiments of the invention, each of the one or more maximum required signal-to-interference plus noise ratio may be smaller than a maximum allowable signal-to-interference plus noise ratio.

According to a further set of exemplary embodiments of the invention, the apparatus may comprise an eNB.

According to another set of exemplary embodiments of the invention, a non-transitory computer readable memory encoded with a computer program comprising computer readable instructions recorded thereon for execution a method comprising: code for determining a maximum required signal-to-interference plus noise ratio for a nominal packet size of a received data signal, wherein the maximum required signal-to-interference plus noise ratio corresponds to a quantity of physical resource blocks used for the nominal packet size of the data signal; comparing a received signal-to-interference plus noise ratio of the received data signal with the maximum required signal-to-interference plus noise ratio, and in response to the received signal-to-interference plus noise ratio exceeding the maximum required signal-to-interference plus noise ratio, performing power control for the data signal to reduce the received signal-to-interference plus noise ratio.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
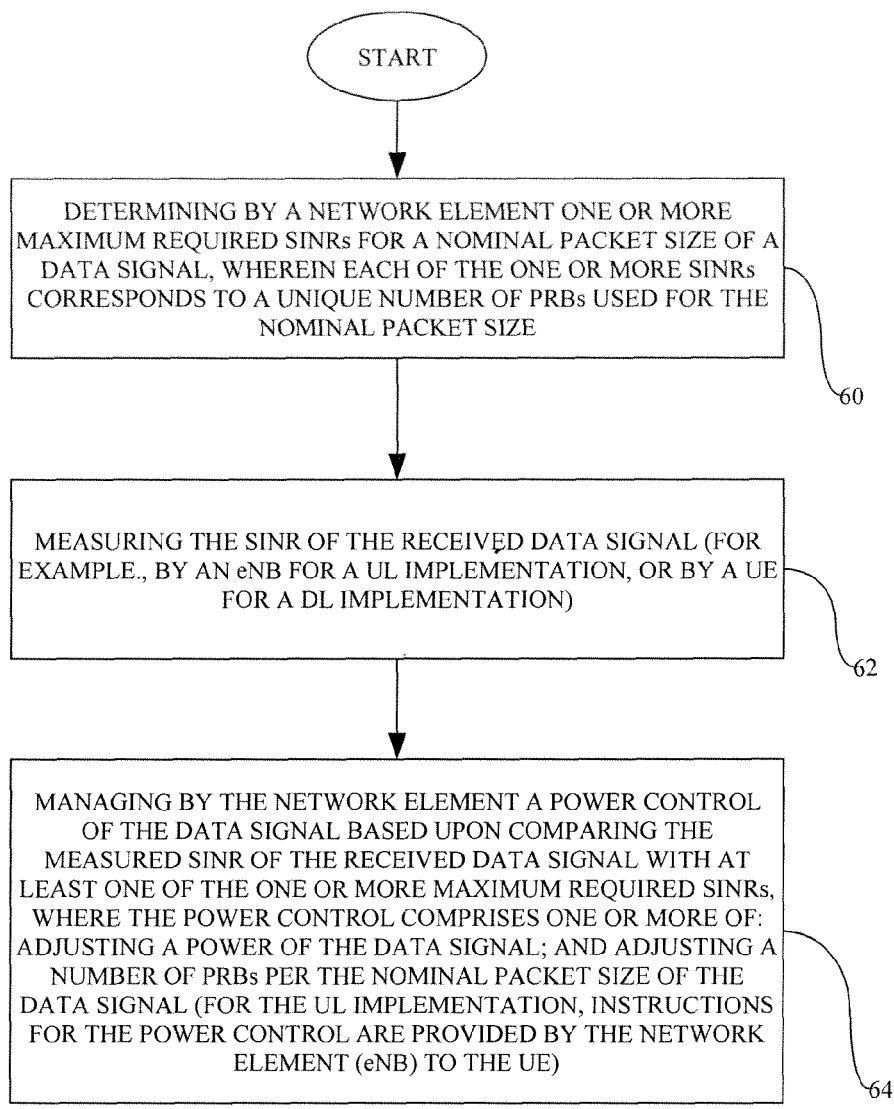
FIG. 1 is a flow chart illustrating a method, and a result of execution by one or more processors of a set of computer program instructions embodied on a computer readable memory, for providing power control based upon nominal packet size in accordance with a set of exemplary embodiments of the invention.

By way of introduction, actively managing signal to interference and noise ratio (SINR) may be based upon any of two management approaches: a) limiting the maximum received signal strength indicator (RSSI) seen at the eNB uplink receiver and b) limiting the maximum SINR seen at the eNB uplink receiver. The RSSI limiting approach ensures that the UE is not transmitting more power to the receiver of the eNB than allowed by the cell specific parameter Ks=0 P0_Nominal_PUSCH calculations. The SINR limiting approach makes sure that the UE is not transmitting more power to the eNB receiver than needed for the highest valid TBS Index. Power control for Ks=0 is done by sending transmitter power control (TPC), illustratively using power control bits, to the UE so that RSSI or SINR limits are maintained at the eNB receiver.

At present, the LTE community seems to have settled on power control using Ks=0. The main problem with this method is that small packets can end up with excessively high C/I when received at the eNB. By making use of the expected payload size of the packets, power control commands can be used according to embodiments of the invention to manage the received C/I to just what is needed, potentially significantly minimizing interference and thus increasing capacity and minimizing the impact on potential edge of cell users in the system.

In other words, there is no need to allow the UE to send a higher SINR to the eNB than what is required for the highest valid TBS Index as that simply creates unnecessary system interference, wasting system capacity and UE battery power.

It is further noted that in Equation 1 $\alpha(j)$ is a factor designed to slope the maximum received power at the target eNB such that the received power at the eNB is allowed to increase slowly as the path loss decreases. When $\alpha(j)=0.8$ for example, the received power at the eNB will be allowed to increase by 1 dB for every 5 dB of path loss decrease, i.e., by ⅕. The UE may observe the downlink path loss from the eNB and use this to estimate the transmitted power to produce this target RSSI on a per PRB basis at the eNB receiver. This target power $P_{O\_PUSCH,c}(j)+(\alpha_c(j)-1)\cdot PL$ (derived using Equation 1) is the "Ks=0 limit" on a per PRB basis. Thus, one limit is the SINR of the highest valid MCS (+Margin), and the other limit is this "ks=0" limit of an RSSI per PRB of $P_{O\_PUSCH,c}(j)+(\alpha_c(j)-1)\cdot PL$. For example, a setting of −91 dB for $P_{O\_PUSCH}$ and an $\alpha(j)$ of 0.8 gives a power at the eNB of only a few dB over the noise floor for a wide range of mid cell conditions to provide a very tightly power limited system that allows for marginally higher received power levels for near cell UEs.

According to a new method, apparatus, and computer-readable memory, a network element such as an eNB manages power control by determining one or more maximum required SINRs for a nominal packet size of a data signal, wherein each of the one or more SINRs corresponds to a unique number of physical resource blocks (PRBs) used for the nominal packet size. Illustratively, power control is provided by adjusting one or more of the power of a data signal and/or a number of PRBs per a nominal packet size of data transmission Typically, the maximum required SINR selected/used is smaller than the maximum SINR the air interface allows, thus reducing interference in the system. The power control of the data signal is based on comparing a SINR of the data signal after being received with at least one of the one or more maximum required SINRs. The exemplary embodiments of the invention may, but need not, be applied to various GBR data with preferably repetitive nominal packet size, e.g., to VoIP with a nominal packet size of 328 bits.

Pursuant to one set of embodiments, a power control may be implemented for the data signal sent from a UE in an uplink (UL) and received by an eNB. In this UL implementation an active power control can be used for Ks=0 to limit the maximum received SINR to that needed for data such as VoIP data rather than the higher SINR required for the normal maximum valid TBS Index.

A similar approach may be taken for downlink (DL) case. For example, UE-specific parameters Pa and Pb (see Section 5.2 of the 3GPP TS 36.213 V10.3.0 (2011-09)) can be used to reduce the power on the DL. This approach may, but need not, be applied to specific UEs. The power reduction may reduce the SINR at the UE and thus limit the available MCS that can be applied using discrete power steps such as 1.77, 3, 4.77, and 6 dB.

Moreover, the eNB implementation keeps track of the required SINR as follows:

$$\text{Required SINR=AWGN SINR for the given TBS Index+SNR\_Error} \quad (3).$$

where SNR_Error term is a part of the power control process to adapt the SINR required for a given TBS Index to account for fading and multipath that cause the SINR requirement to be different from the AWGN SINR estimate.

The TBS index may be selected for the nominal packet size and a number of PRBs using Table 7.1.7.2.1-1 on page 34 of 3GPP TS 36.213 V10.3.0 (2011-09). According to this embodiment, the chosen TBS index is lower than a maximum TBS index for the transmitted/received data. For example, a VoIP frame (nominally 328 bits) could be carried by TBS Index 16 using one PRB or using TBS Index 10 using two PRBs, whereas the maximum allowable TBS index is 26 (e.g., for 64 QAM) or 22 (e.g., for 16 QAM if ECP is off and is SRS is not used).

The eNB implementation comprises checking whether the received SINR exceeds the maximum required SINR which can be calculated as follows:

$$\text{Max required SINR=AWGN SINR for the given TBS Index+SNR\_Error+Margin} \quad (4).$$

The Margin term in Equation 4 is needed since a precise power control is not possible in a fading environment. The margin term can be in the 1 to 8 dB range. The Margin term is a variable which may adjust to the RF conditions to give a more consistent BLER over a range of RF fading conditions.

Thus, if the received SINR of the data signal from the UE measured by the network element (such as eNB) is higher than this threshold determined by the Equation 4, a power down command can be issued by the eNB to the UE. However, if the received SINR of the data signal from the UE measured by the network element (such as eNB) is less than the threshold determined by the Equation 4, a power up command can be issued by the eNB to the UE.

By limiting the maximum SINR to only what is needed, the interference in the system is reduced which allows for either more users, or higher throughput for data user on the unused resource, and better edge of cell coverage (as interference is reduced). In other words, other users in the adjacent cells will see less interference and lower interference will allow data user to get better throughput.

According to a further embodiment, the concept described herein could be applied to using an even lower SINR ceiling with two or more PRBs per the nominal packet size of data. For example, two PRBs per VoIP packet (328 bits) need 3 dB SINR (AWGN)+margin, and one PRB per VoIP packet needs 9.6 dB SINR (AWGN)+margin. Then it may be possible to limit the SINR to 9.6 db (one PRB) until the UE could no longer support 9.6 dB, then reduce the SINR limit to 3 dB (two PRBs). Once the SINR has been limited to 3 dB (+margin), PHRs could be used to determine when the UE has enough power to support the higher 9.6 dB (+margin) limit once again.

The power control process described herein may comprise one or more of: adjusting a power of the data signal and adjusting a number of PRBs per the nominal packet size of the data signal, where the number of PRBs for the nominal packet size is decreased when the SINR of the received data signal is larger than a predetermined threshold (for example, determined using Equation 4), whereas the number of PRBs used in the nominal packet size is increased when the SINR of the received data signal is smaller than this predetermined threshold. Illustratively, power control may be performed using a TPC command.

Moreover, of the one or more maximum required SINRs may be selected by the network element (eNB) based on RF conditions of the UE sending the data. In general, the one or more maximum required SINRs may correspond to 1, 2, . . . , N PRBs respectively, where N is a finite integer of one or more. In other words, in this embodiment the eNB can use the UE's RF conditions to select the use of 1 to N PRBs for sending the (maximum) packet size and using that size as a limit to the maximum required SINR to be allowed.

Rather than picking a hard limit such as TBS Index 10 (2 PRBs for 328 bits) or TBS Index 16 (1 PRB for 328 bits), the system may dynamically change the C/I limit between these two levels based upon the SINR being received at the time. However, once the SINR is being limited to TBS 10, the eNB may not see a SINR high enough to get back up to (TBS index (corresponding to MCS index 17). However, periodic reception of Power Headroom Reports (PHR) would let the eNB know when the UE has a good enough RF environment to issue power ups to the UE to get the SINR back up to that needed for TBS Index 16, one PRB. Also it is possible to limit the number of PRBs to a larger size, using PHR to determine if the UE has enough power to support a fewer number of PRBs using a high SINR limit.

It is further noted that there are many PRB/TBS index combinations that could be used. The more PRBs that are used, e.g., for the VoIP traffic, the lower the C/I which is needed on a per PRB basis. However, using more PRBs than is necessary limits the PRBs that are available for other users.

The exemplary embodiments described herein include a set of UL implementations and a set of DL implementations. The UL implementations use a network element such as an eNB to perform data signal power control for UL transmission by the UE. The DL implementations may be used to perform power control of DL data transmission by the eNB. For example, the UE can report the CQI which is translated into a DL MCS or TBS Index. This MCS or TBS may be used as a trigger to power down the eNB DL signal for that UE using Pa and Pb parameters as discussed above.

The embodiments of the invention provide a number of technical effects and advantages which may include (but are not limited to) the following:
a) lowering the interference in the system by making sure a small packet data mode (like VoIP) uses no more power than needed in the system;
b) increasing the data transmission capacity, increasing data throughput on unused PRBs, increasing edge of cell coverage, lowering UE battery drain and throughput all due to decreased system interference; and
c) increasing available power to the UE (less battery usage, high SINR margins for high data throughput).

FIG. 1 is a flow chart illustrating a method, and a result of execution by one or more processors of a set of computer program instructions embodied on a computer readable memory, for providing power control based upon nominal packet size in accordance with a set of exemplary embodiments of the invention. It is noted that the order of steps shown in FIG. 1 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 1, in a first step 60, a network element such as eNB determines one or more maximum required SINRs for a nominal packet size of a received data signal (e.g., VoIP), where each of the one or more SINRs corresponds to a unique number of PRBs used for the nominal packet size (e.g., for Ks=0 based on RF conditions for a UE and for a data signal received from the UE for UL implementation).

In a next step 62, the SINR of the received data signal is measured, e.g., by the eNB for the UL implementation, or by the UE for the DL implementation where the UE can provide the results of the SINR measurements to the eNB. In a next step 64, the network element such as eNB manages a power control of the data signal based on comparing the measured SINR (in step 62) of the received data signal with at least one of the one or more maximum required SINRs (determined in step 60), where the power control comprises one or more of: adjusting a power of the data signal and adjusting a number of PRBs per the nominal packet size of the data signal. For example, for the UL implementation instructions for the power control are provided by the network element such as eNB to the UE. For example, after the SINR has been reduced using power down commands, resulting in a low MCS and a larger number of PRBs, it is possible to subsequently move back up to a fewer number of PRBs and a larger MCS using power up commands in response to a PHR (power Headroom Report) showing that excess power exists to power the UE up and to allow for a high SINR, a high MCS and fewer PRBs.

Figure 2:
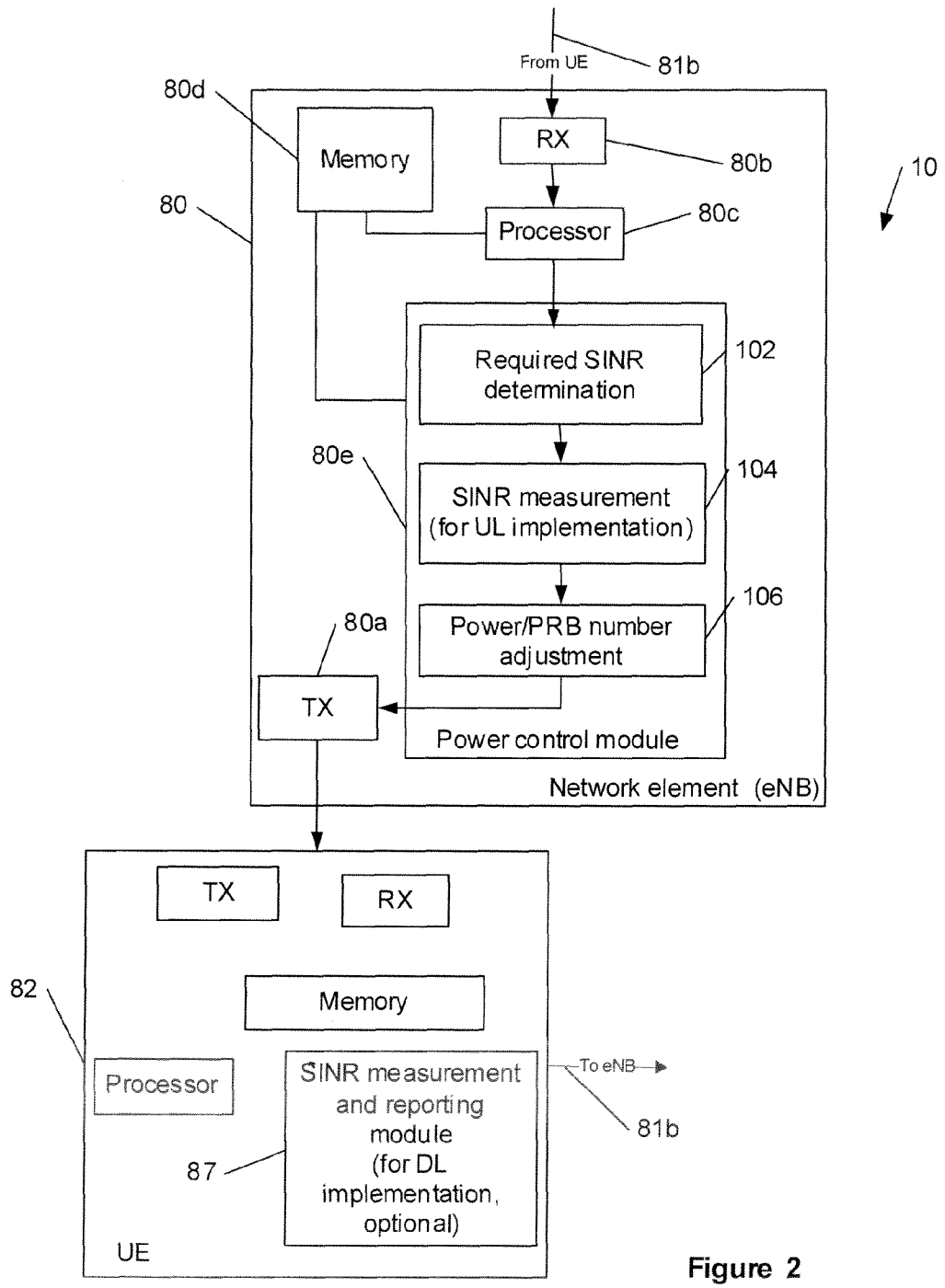
FIG. 2 is a block diagram of network elements for practicing a set of exemplary embodiments of the invention.

FIG. 2 is a block diagram illustrating exemplary LTE devices including a network element (such as an eNB) 80 comprised in a network 10, and a UE 82, according to a set of exemplary embodiments of the invention. More specifically, FIG. 2 shows various electronic devices that are suitable for practicing the exemplary embodiments of this invention, e.g., in reference to FIG. 1 and exemplary embodiments described herein, and various specific manners in which components of an electronic device may be configured to cause that electronic device to operate.

The network element (eNB) 80 may comprise at least one transmitter 80*a* at least one receiver 80*b*, at least one processor 80*c* at least one memory 80*d* and a power control module 80*e*. The transmitter 80*a* and the receiver 80*b* may be configured to provide a wireless communication with the UE 82 using corresponding links 81*a* and 81*b*, according to the embodiment of the invention. The transmitter 80*a* and the receiver 80*b* may be generally means for transmitting/receiving and may be implemented as a transceiver, or a structural equivalence thereof. It is further noted that the same requirements and considerations are applied to transmitters and receivers of the device 82.

Various embodiments of the at least one memory 80*d* (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80*c* include but are not limited to general purpose computers, special purpose computers, microprocessors, digital signal processors (DSPs) and multi-core processors. Similar embodiments are applicable to memory and processor in the UE 82 shown in FIG. 2.

The power control module 80e may provide various instructions for performing steps 60-64 shown in FIG. 1. The power control module 80e may comprise a required SINR determination application/module 102 for implementing step 60 shown in FIG. 1, a SINR measurement application/module 104 for implementing step 62 shown in FIG. 1, and power and/or PRB number adjustment application/module 106 for implementing step 64 shown in FIG. 1.

The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 80e may be implemented as a separate block or may be combined with any other module/block of the device 80, or it may be split into several blocks according to their functionality.

The device/UE 82 may have similar components as the network element 80, as shown in FIG. 1, so that the above discussion about components of the eNB 80 is fully applicable to the components of the device/UE 82.

The SINR measurement and reporting module 87 may provide various instructions for performing (optionally) step 62 shown in FIG. 1 for DL implementation. The module 87 may be implemented as an application computer program stored in the memory of the device 82, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

We claim:

1. A method comprising:
    determining a maximum required signal-to-interference plus noise ratio for a nominal packet size of a received data signal, wherein the maximum required signal-to-interference plus noise ratio corresponds to a quantity of physical resource blocks used for the nominal packet size of the data signal;
    determining a plurality of respective maximum required signal-to-interference plus noise ratios for each of a plurality of corresponding nominal packet sizes of a data signal, wherein each of the plurality of maximum signal-to-interference plus noise ratios corresponds to a quantity of physical resource blocks used for the corresponding nominal packet size of the data signal;
    comparing a received signal-to-interference plus noise ratio of the received data signal with the maximum required signal-to-interference plus noise ratio; and
    in response to the received signal-to-interference plus noise ratio exceeding the maximum required signal-to-interference plus noise ratio, issuing a power down command to a user equipment.

2. The method of claim 1 wherein performing power control comprises one or more of: adjusting a power of the data signal and adjusting a total number or quantity of physical resource blocks per the nominal packet size of the data signal.

3. The method of claim 2 wherein the total number or quantity of physical resource blocks for the nominal packet size is decreased when the received signal-to-interference plus noise ratio is larger than a predetermined threshold.

4. The method of claim 2 further comprising receiving a power headroom report indicating an excess of unused power and, in response thereto, reducing the number or quantity of physical resource blocks, wherein the excess power is allocated among the reduced number or quantity of physical resource blocks.

5. The method of claim 2 wherein the number of physical resource blocks used in the nominal packet size may be increased when the received signal-to-interference plus noise ratio is smaller than a predetermined threshold.

6. The method of claim 1 wherein power control is performed using a cell specific parameter Ks=0 and the data signal is received from a user equipment.

7. The method of claim 1 further comprising selecting a number or quantity for the plurality of maximum required signal-to-interference plus noise ratios based on one or more radio frequency conditions of a user equipment that sent the received data.

8. The method of claim 1 further comprising measuring the signal-to-interference plus noise ratio of the received data signal; and a network element providing to the user equipment instructions for the power control of the data signal based on comparing the measured signal-to-interference plus noise ratio of the received data signal with at least one of the plurality of maximum required signal-to-interference plus noise ratios.

9. The method of claim 1 wherein the plurality of maximum required signal-to-interference plus noise ratios corresponds to 1, 2, . . . , N physical resource blocks respectively, where N is a finite integer greater than zero.

10. The method of claim 1 wherein each of the quantity of physical resource blocks has a corresponding transport block size index which is lower than a maximum transport block size index for the received data.

11. The method of claim 1 wherein each of the plurality of maximum required signal-to-interference plus noise ratios is calculated as a sum of an average signal-to-interference plus noise ratio for a corresponding transport block size index, plus a signal-to-noise ratios error and plus a margin.

12. The method of claim 1 wherein the received data signal represents voice over internet protocol data with a nominal packet size of 328 bits.

13. The method of claim 1 wherein each of the plurality of maximum required signal-to-interference plus noise ratios is smaller than a maximum allowable signal-to-interference plus noise ratio.

14. An apparatus comprising at least one processor and a memory storing a set of computer instructions, in which the processor and the memory storing the computer instructions are configured to cause the apparatus to:
- determine a maximum required signal-to-interference plus noise ratio for a nominal packet size of a received data signal, wherein the maximum required signal-to-interference plus noise ratio corresponds to a quantity of physical resource blocks used for the nominal packet size of the data signal;
- determine a plurality of respective maximum required signal-to-interference plus noise ratios for each of a plurality of corresponding nominal packet sizes of a data signal, wherein each of the plurality of maximum signal-to-interference plus noise ratios corresponds to a quantity of physical resource blocks used for the corresponding nominal packet size of the data signal;
- compare a received signal-to-interference plus noise ratio of the received data signal with the maximum required signal-to-interference plus noise ratio; and
- in response to the received signal-to-interference plus noise ratio exceeding the maximum required signal-to-interference plus noise ratio, issue a power down command to a user equipment.

15. The apparatus of claim 14 wherein performing power control comprises one or more of: adjusting a power of the data signal and adjusting a number of physical resource blocks per the nominal packet size of the data signal.

16. The apparatus of claim 15 further comprising instructions for receiving a power headroom report indicating an excess of unused power and, in response thereto, reducing the number or quantity of physical resource blocks, wherein the excess power is allocated among the reduced number or quantity of physical resource blocks.

17. The apparatus of claim 14 wherein power control is performed using a cell specific parameter $K_s=0$ and the data signal is received from a user equipment.

18. The apparatus of claim 14 wherein the plurality of required signal-to-interference plus noise ratios corresponds to $1, 2, \ldots, N$ physical resource blocks respectively, where N is a finite integer greater than zero.

19. The apparatus of claim 14 wherein each of the quantity of physical resource blocks has a corresponding transport block size index which is lower than a maximum transport block size index for the received data.

20. The apparatus of claim 14 wherein each of the plurality of maximum required signal-to-interference plus noise ratios is smaller than a maximum allowable signal-to-interference plus noise ratio.

21. A computer program product embodied on a non-transitory computer readable memory encoded with a computer program comprising computer readable instructions recorded thereon for execution a method comprising code for:
- determining a maximum required signal-to-interference plus noise ratio for a nominal packet size of a received data signal, wherein the maximum required signal-to-interference plus noise ratio corresponds to a quantity of physical resource blocks used for the nominal packet size of the data signal;
- determining a plurality of respective maximum required signal-to-interference plus noise ratios for each of a plurality of corresponding nominal packet sizes of a data signal, wherein each of the plurality of maximum signal-to-interference plus noise ratios corresponds to a quantity of physical resource blocks used for the corresponding nominal packet size of the data signal;
- comparing a received signal-to-interference plus noise ratio of the received data signal with the maximum required signal-to-interference plus noise ratio; and
- in response to the received signal-to-interference plus noise ratio exceeding the maximum required signal-to-interference plus noise ratio, issuing a power down command to a user equipment.

* * * * *